Nov. 12, 1968  J. H. MILLER  3,410,223
RACE TRACK WITH COOPERATING RACE CAR RETAINING MEANS
Filed March 9, 1966  3 Sheets-Sheet 1
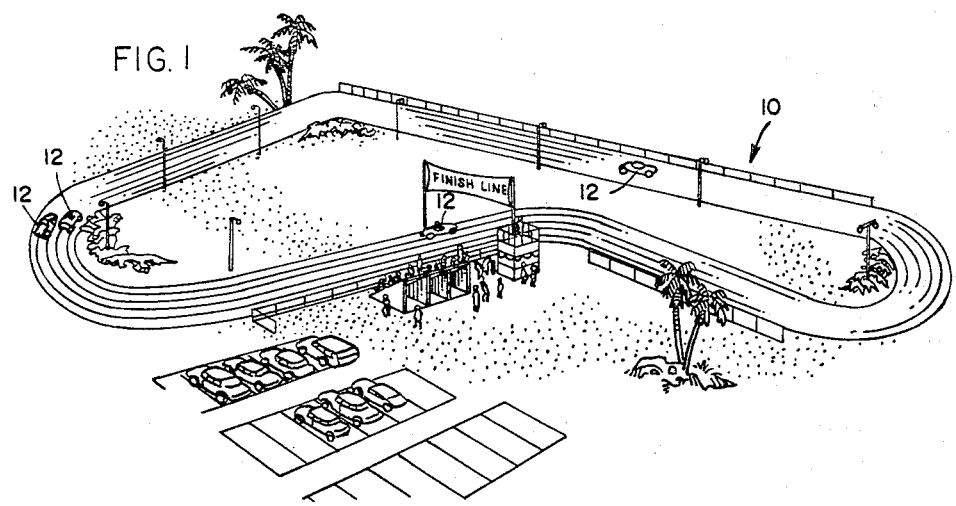
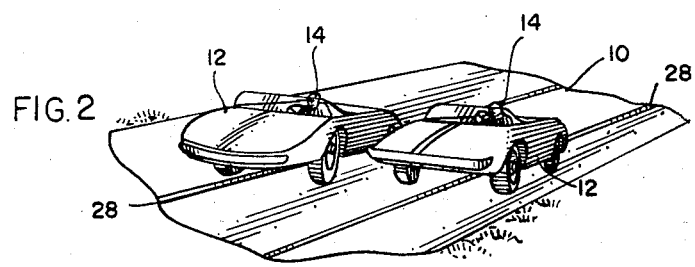
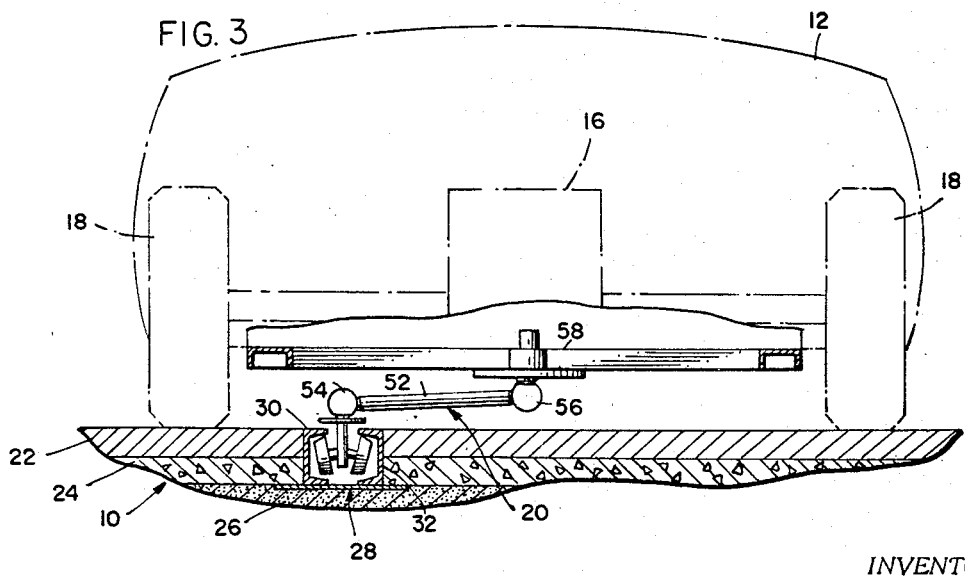
INVENTOR:
JOHN H. MILLER
BY
Dawson, Tilton, Fallon, Lungmus & Alexander
ATT'YS

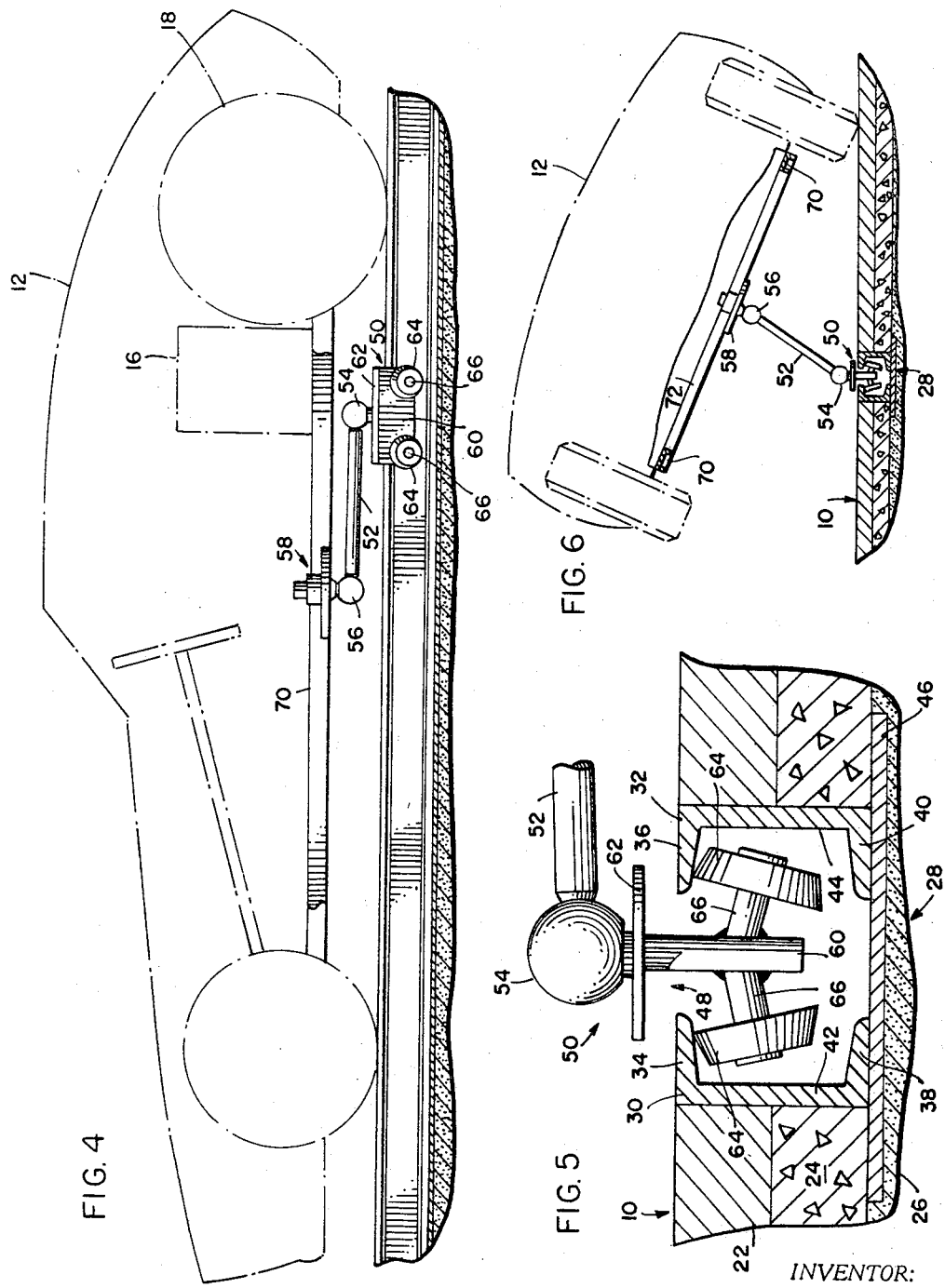

Nov. 12, 1968   J. H. MILLER   3,410,223
RACE TRACK WITH COOPERATING RACE CAR RETAINING MEANS
Filed March 9, 1966   3 Sheets-Sheet 3
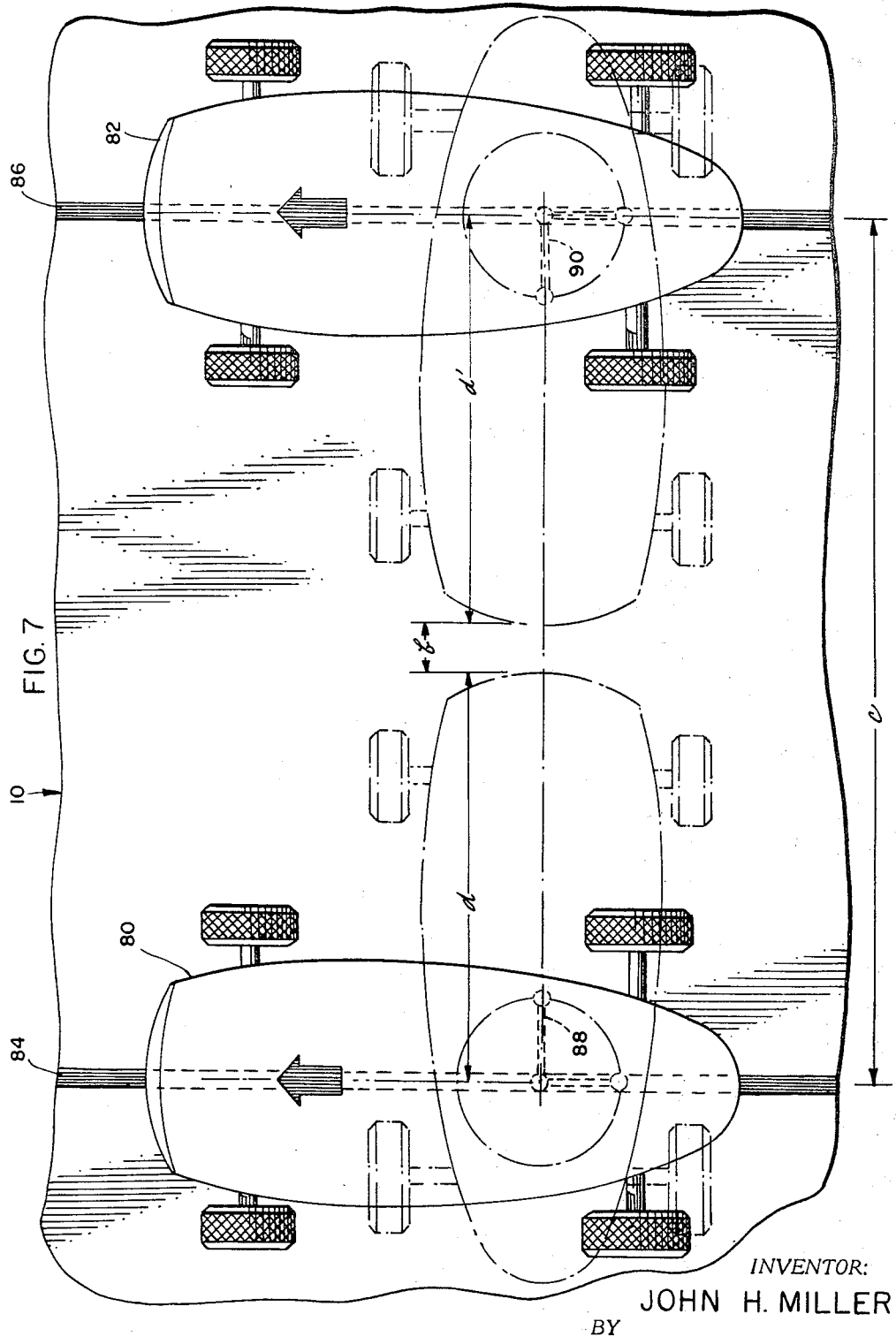
INVENTOR:
JOHN H. MILLER
BY
Dawson, Tilton, Fallon, Lungmus & Alexander
ATT'YS

United States Patent Office 3,410,223
Patented Nov. 12, 1968

3,410,223
RACE TRACK WITH COOPERATING RACE
CAR RETAINING MEANS
John H. Miller, 325 Lookout View Court,
Golden, Colo. 80401
Filed Mar. 9, 1966, Ser. No. 533,045
10 Claims. (Cl. 104—60)

ABSTRACT OF THE DISCLOSURE

The combination of a self-propelled race car adapted to be driven by an occupant, and a track-equipped road for supporting the car, the car and track being interconnected by means of a dolly and a linkage assembly. The track, which is imbedded in the road, partially receives the dolly and such dolly is free to move along the track but is restrained against vertical and lateral movement with respect thereto. The linkage extends from the underside of the vehicle, from a point between the front and rear wheels thereof, to the dolly, with universal joints at both ends of the link joining it to the vehicle and dolly, respectively. A plurality of such tracks are provided in the road so that a number of such cars may be raced simultaneously, each restrained against excessive movement by its own track, dolly and linkage assembly, while at the same time being capable of a substantial range of lateral, vertical, and horizontal rotational movement for the exercise of driving skill by the occupant of each car.

---

This invention relates generally to a racing vehicle assembly and more particularly to an assembly wherein the vehicle is connected to the racecourse.

Relatively small self-propelled racing cars, such as the type commonly called "go-carts," are usually driven on circular or winding racecourses. When such a car is driven competitively, especially by an unskilled driver, there is a danger that the car may overturn, collide with other cars, run into spectators, or otherwise be damaged or wrecked. The dangers of serious injury to drivers and spectators which are always present, has presented difficult problems of responsibility and liability and, in general, has greatly hampered the development and popularity of "go-carts" and similar racing vehicles.

These dangers can be reduced, or substantially eliminated from the racing of small cars, by securely connecting their wheels to rails in a manner similar to that utilized by trains; however when such a racing vehicle is supported and guided by a pair of rails or by other positive guiding means, it is apparent that maneuverability, and the enjoyment and demonstration of skill which arise from such maneuverability, are lost.

Therefore, one of the objects of this invention is to provide a racing vehicle assembly wherein the vehicle can be raced by an inexperienced driver with very little or no danger to the driver, spectators, or property.

Another object of this invention is to provide a racing vehicle assembly which cannot be damaged by collision during a race.

Another object of this invention is to provide a racing vehicle assembly which is attached to a racecourse and has the maneuverability and handling characteristics of an unattached vehicle.

Another object of this invention is to provide a racing vehicle assembly wherein a racing vehicle which is attached to the racecourse is capable of substantial lateral, vertical, and rotational movement from a predetermined path of travel about the course.

For a fuller understanding of the nature and objects of the invention, reference should be had to the following description taken in connection with the accompanying drawings wherein:

FIG. 1 is a perspective view of a racecourse embodying the invention;

FIG. 2 is a perspective view of a pair of racing vehicles embodying the invention;

FIG. 3 is a detailed sectional view of the means for attaching the racing vehicle to the racecourse;

FIG. 4 is a detailed sectional view, lengthwise of the racing vehicle, of the means for attaching the racing vehicle to the racecourse;

FIG. 5 is a detailed fragmentary sectional view of the connection structure utilized for attaching the racing vehicle to the racecourse;

FIG. 6 is a somewhat exaggerated and schematic sectional view of a racing veihcle embodying the invention turning a corner at high speed; and FIG. 7 is a detailed plan view of a pair of racing vehicles embodying the invention.

Referring now to the drawings in greater detail, there is shown in FIG. 1 a perspective view of a racecourse or road 10 upon which vehicles or cars 12 are raced. The racecourse or road 10 can be of any desired shape and length. The width of the racecourse will vary as a function of the number of cars which are to be driven in a given race. While only four vehicles or cars 12 are shown on the racecourse or road 10, it will be apparent that the course could be adapted to accommodate any desired number of cars.

The vehicles are shown in greater detail in FIG. 2, wherein two of the vehicles 12 are illustrated in side-by-side position on the racecourse 10. The driver of each vehicle 12 steers by the use of a conventional steering mechanism, which is well known to those skilled in the art and need not be described in greater detail at this time. Each vehicle is self-powered by an internal combustion engine 16 (see FIG. 3) which, in the illustration given, is mounted between the rear wheels 18. While the use of an internal combustion engine has been found particularly effective, however, it is to be understood that other completely self-contained power plants, which do not derive their power through conduits embedded in or suspended above the road 10, could also be used. The road 10 is made up of a hard upper surface layer 22, such as asphalt, and an asphalt and gravel layer 24 which is placed on a suitable packed dirt base 26 (see FIGS. 3 and 5). The particular structure utilized for the racecourse or road 10 does not constitute a part of this invention, and the racecourse or road 10 may be made of any satisfactory known road material. It will be apparent that the basic requirement for the racecourse or road 10 is that the uppermost surface 22 of the road provide a smooth and hard surface for the racing vehicles 12 to be driven on.

Mounted within the road or racecourse 10 are parallel tracks 28 which are engaged by a connection or linkage means 20 to attach the vehicle 12 to the tracks. Each of the tracks 28 includes a pair of spaced apart and substantially parallel channel members 30 and 32 (see FIG. 5). The channel members 30 and 32 both have a pair of generally horizontal upper flange members 34 and 36, and a pair of substantially horizontal lower flange members 38 and 40. The flange members 34 and 38 are interconnected by a vertical web 42. The flange members 36 and 40 of the channel 32 are, in a similar manner, interconnected by a vertical web 44.

The two channel members 30 and 32 are mounted with the uppermost surface of the flanges 34 and 36 in a position which is coplanar with the uppermost surface of the racecourse or road 10. The two channel members 30 and 32 are retained in this positon by a support or connecting plate 46 which is attached, by a suitable connection means, to the two lower flanges 38 and 40. The support or connecting plate 46 extends outwardly of the two channels 30 and 32 so that an upwardly directed load force, applied by the connection structure 20, will be distributed over a relatively large area of the racecourse or road 10. The distance by which the support or connecting plate extends outwardly relative to the two channel members 30 and 32 will, of course, depend upon the relative strength of the materials utilized for the racecourse or road 10. It is contemplated that if required by a particular road structure, other support plates could be connected to the channels 30 and 32 to further distribute the load from the connection structure 20 to the road or racecourse 10.

The use of two inwardly facing channels 30 and 32 has been found to be particularly advantageous since the load applied to the connection or linkage means 20 by the vehicle 12 will be distributed evenly between two channel members. In addition, the use of two channel members results in a single slot or opening 48 in the upper surface of the racecourse or road 10. However, a single track member, having a shape similar to that of an I-beam, could be utilized in place of the two channel members 30 and 32.

The connection or linkage means 20 includes a dolly structure 50 (see FIGS. 4 and 5), a link or connecting member 52, a pair of universal joints 54 and 56, and a vehicle connector unit or plate 58. From an inspection of FIGS. 3 and 4 it will be apparent that the dolly structure 50 fastens the vehicle 12 to the track 28 through the use of the connecting link 52 which is attached to the dolly or carriage by the universal joint 54. The connecting link 52 is also attached to the vehicle or car 12 by the universal joint 56 and connecting plate or unit 58.

The dolly structure 50 includes a substantially vertical body member 60 which extends upwardly through the opening or slot 48 between the two channel members 30 and 32. The upper portion of the body member 60 is connected to a mounting plate 62 on which the universal joint 54 is mounted. The plate 62 is positioned above the channels 30 and 32 so that when the dolly 50 is sharply tilted, the outer edges of the plate just clear the upper surfaces of the flange members 34 and 36.

The dolly 50 is supported by four rotatably mounted wheels 64 which are fastened to axles 66. The four identical wheels 64 will engage the inner surface of the upper flanges 34 and 36 of the two channels 30 and 32 when an upward force is exerted on the dolly structure 50. When the upward force on the dolly structure 50 is removed, it will be apparent that the wheels 64 will roll on the inner surface of the lower flanges 38 and 40 of the two channels 30 and 32. The four wheels 64 will distribute any load applied to the dolly 50 to the channels 30 and 32 at four, spaced apart, points. Thus, it is advantageous to use four wheels in order to distribute any shock or load applied by the dolly to the channels 30 and 32.

The wheels 64 are all of a frustoconical shape. Only the innermost or base portion of the wheels 64 will, therefore, engage the upper flanges 34 and 36. When the dolly or carriage 50 is riding in its normal position, with the wheels 64 on the lowermost flanges 38 and 40, the slanting surfaces of the wheels will mate with the upper surfaces of the lower flanges 38 and 40. Thus, when the wheels are in their normal position, the wear on all four wheels will be evenly distributed.

The axles 66, of the dolly structure 50, are positioned at an acute angle relative to the body member 60 of the dolly (see FIG. 5). Since the axles 66 are angled, relative to the body 60, the outermost edge portion of the wheels 64 will engage the webs 42 or 44 of the channels 30 and 32 when a transverse or sidewise force is applied to the dolly structure 50. When a force having both a transverse or sidewise component, and a longitudinal or lengthwise component, is applied to the dolly structure 50 the outer edge portion of the wheels 64 will rotate along the webs 42 and 44 of the channels 30 and 32. The outer surface of the axles 66 will not contact the webs of the channels, since the outermost edge of the wheels 64 will hold the wheels outwardly from the webs of the channels.

From the foregoing description, it will be apparent that the wheels 64 permit the dolly to be moved longitudinally along the track 28 with a minimum amount of frictional resistance. The wheels 64 will, when there is no upward load applied to the dolly structure, run longitudinally along the lower flanges 38 and 40 of the channels 30 and 32. When an upward load is applied to the dolly 50, the wheels 64 will rotate along the inner surface of the upper flanges 34 and 36. If both a longitudinal and transverse force is applied to the dolly structure 50, the wheels 64 will rotate along both the upper flanges 34 and 36 and the inner surface of the one of the webs, depending upon the direction from which the transverse force is applied to the dolly structure, of the two channels 30 and 32. Thus, the dolly structure 50 is securely connected to the track 28, for longitudinal movement relative to the track, while providing a minimum amount of frictional drag to the forward motion of the racing vehicle or car 12.

The connecting structure or link 52 is connected to the dolly 50 by means of a universal joint 54. The universal joint 54 may be of any known construction which permits the link 52 to move universally around the carriage 50 so that the link or connecting structure 52 can freely rotate and swing in all directions, above the support plate 62. This freedom for universal movement enables the connector plate or unit 58 to move to any point of a hemispherical plane having its center at the universal joint 54.

The link 52 is attached to the vehicle or car 12 by a second universal joint 56 which is mounted on a connector plate or unit 58. The universal joint 56, of any suitable known structure, enables the connector plate or unit 58 to move universally relative to the link 52, in the same manner as previously explained for the universal joint 54. The connector unit 58 may be of any suitable structure for fastening to the frame 70 of the vehicle 12. It is contemplated that the connector plate or unit 58 will be welded to a rigid cross member structure 72 which extends between the two side frame members 70 of the vehicle 12 (see FIG. 6). For optimum handling characteristics, the connector plate or unit 58 should be mounted intermediate the front and rear wheels of the vehicle.

When the racing vehicle or car 12 is driven in a race the dolly structure 50 will be dragged behind the connector unit 58. The connection structure 20 will not affect the forward motion of the vehicle 12 longitudinally along the tracks 28, since the dolly or carriage rides freely in the slot or opening 48 between the two channels 30 and 32. When the car or vehicle 12 moves transversely, or across, the tracks 28 (see FIG. 3) the connection structure 20 will not affect the sidewise motion of the vehicle until the vehicle has moved a predetermined distance, determined by the length of the link 52, to the side of the track 28. After the vehicle has moved sidewise as far as the connection means 20 will permit the connection structure will apply a restraining force to the vehicle or racing car 12, since the dolly 50 will engage the inner surface of the upper flanges 34 and 36 of the track 28 to prevent any further movement of the vehicle to the side. Thus, when the vehicle 12 is, for instance, driven into a curve at too great a speed for the curve, and the vehicle begins to slide sideways, the connection means 20 will restrain the vehicle or racing car 12 from sliding off the road or racecourse 10.

It will also be apparent that if the vehicle 12 tends to roll over (see FIG. 6) the connection structure 20 will prevent the vehicle from overturning. After the vehicle has reached the limit of the upward movement permitted by the connection structure it will be restrained from overturning by the dolly 50 and link 52. This limitation on the vertical movement of the vehicle results from the engagement of the wheels 64 of the carriage 50 with the inner surface of the flanges 34 and 36 of the channels 30 and 32.

If, during the course of the race, the vehicle should "spin out" the connection structure 20 will, while permitting the vehicle to "spin" or rotate, prevent the vehicle from spinning completely off the road 10. When the vehicle 12 "spins out" the link 52 will pull the dolly 50 first to one side and then to the other side of the track 28. This sidewise or transverse motion of the dolly will cause the wheels 64 to engage the inner surface of the webs 42 and 44 of the two channels 30 and 32 in the manner previously explained.

It will also be apparent that when the car or vehicle 12 "spins out" the car would in all probability, retain its forward motion, while spinning, relative to the track 28. During the "spin out" the car or vehicle will rotate, around the universal joint 54, and move longitudinally relative to the track at the same time to pull the dolly 50 forwardly and exert a sidewise or transverse force on the carriage structure. Since the upper surface of the flanges 34 and 36 is coplanar with the upper surface of the track 10, the vehicle 12 can move freely across the track while spinning. Thus, the vehicle will handle, during a spin, in much the same manner as an unattached vehicle, until the limit of transverse motion permitted by the connection structure 20 is reached by the vehicle while spinning.

When a vehicle "spins out" the link 52 will, in all probability, make a complete revolution around the universal joint 54. At the same time the vehicle may rotate around the universal joint 56. While this movement is taking place it is essential that the wheels of the vehicle do not get in a position to contact or run over the link 52 or dolly 50. Therefore, it is advantageous to place the connector plate or unit 58 near the center of the vehicle and to make the length of the link 52 somewhat shorter than the distance from the connector plate to either the front or rear wheels (see FIGS. 3 and 4).

From the foregoing description it will be apparent that the vehicle 12, could, if driven by an inept driver, simultaneously move longitudinally along the track 28, "spin out," and tend to roll or turn over. There would then be a simultaneous movement of the vehicle forwardly along the track, transversely and rotatably in a sidewise direction with respect to the track, and upwardly with respect to the track. This motion of the attached vehicle 12 would be in all respects similar to that of an unattached vehicle, until the limit of motion permitted by the connecting structure 20 was reached. When the vehicle reaches the limit of motion permitted by the connecting structure 20, it will be apparent, from the foregoing discussion, that further motion of the vehicle in that direction will be halted. Because the racing vehicle or car 12 can move for only a predetermined distance relative to the track 28, the driver of the car is protected against his own inexperience and inability to control the car. Since the car cannot roll over or run off the track, it will be apparent that the driver is relatively safe while still being able to enjoy the delights and excitement of controlling the racing vehicle.

The driver's control of the vehicle is not unduly limited by the connection structure 20 since it does not guide or otherwise affect the motion of the vehicle, as long as the vehicle remains within a predetermined distance relative to the track 28. The driver can control, by an accelerator, the amount of power transmitted from the engine 16 to the rear wheels 18 of the vehicle. The driver can also control the direction of motion, within the predetermined limits permitted by the connection structure 20, of the racing vehicle 12. Thus, it will be apparent that the driver is protected from injury to both himself and others by the connection structure 20 and, at the same time, is permitted to control the speed and direction of motion of the vehicle 12.

Referring now to FIG. 7, a racing course is illustrated wherein two vehicles 80 and 82 are positioned beside each other. The two cars 80 and 82 are similar, in all respects, to the racing vehicle 12. The two racing cars 80 and 82 are each connected to an associated track 84 and 86 by the connecting structures 88 and 90. The connecting structures 88 and 90 and the tracks 80 and 82 are similar to those previously described.

The two track structures 84 and 86 are positioned apart by a predetermined distance $c$ so that the two cars 80 and 82 cannot, under any condition, collide with each other. The frontmost portion of the car 80 can extend transversely of the track structure 84 for a distance $d$ equal to the length from the front of the car to the carriage of the connector structure 88. Similarly, the car or racing vehicle 82 can extend transversely of the track structure 86 for a distance $d'$ which is equal to the distance from the front of the vehicle 82 to the carriage or dolly structure for the connecting structure 90. Since the distance $c$ is slightly greater, by an amount $b$, than the sum of the distance $d$ and $d'$, it will be apparent that the two cars 80 and 82 will not collide even if both of the cars should simultaneously "spin out" or "slide" (as is indicated by the dashed lines in FIG. 7).

While only two tracks for a pair of racing vehicles have been shown in FIG. 7, it will be apparent to those skilled in the art that any desired number of tracks, and associated racing vehicles, may be utilized on a given racecourse. Since the tracks are spaced sufficiently far apart so that the vehicles cannot collide, any number of cars or vehicles may be raced safely at a given time.

*Method of operation*

For purposes of affording a more complete understanding of the invention, it is advantageous now to provide a functional description of the mode in which the component parts cooperate. The racecourse or road structure 10, as shown in FIG. 1, has a plurality of tracks 28 imbedded in the road. Associated with each track 28 is a self-powered racing vehicle or car 12. The racing vehicles 12 are attached to the track 28 by a connection structure 20. The connection structure 20 includes a dolly 50, a link 52 connected to the dolly 50 by means of a universal joint 54, and a connector plate or unit 58 which is connected to the link 52 by means of the universal joint 56. While the link 52 has been shown as a relatively rigid structure, it will be apparent to those skilled in the art that a flexible member having sufficient tensile strength, such as a chain, could also be utilized. However, a relatively rigid link is preferred, since it will not drag on the track and become weakened or damaged while the racing vehicle or car 12 is in motion (see FIG. 4).

The dolly 50 can move freely longitudinally of the track structure 28. The racing vehicle 12 can, therefore, move both longitudinally down the track and transversely, for a predetermined distance, limited by the length of the link 52 relative to the track structure 28. The track structure 28 is imbedded in the road or racecourse 10 with the upper surface of the track structure coplanar with the upper surface of the road or racecourse 10. Thus, the racing vehicle or car 12 can freely crisscross the track structure 28.

Since the racing vehicle or car 12 is attached to the track 28, it will be apparent that the vehicle can move for only a predetermined distance transversely and vertically relative to the track. If the racing vehicle or car 12 should "spin out," tend to overturn, or otherwise move in a direction which, if the motion was unchecked, would result in a wreck the car or vehicle would be prevented from being wrecked by the connection structure 20. Thus, even an inexperienced driver can safely drive the attached vehicle 12 and experience all of the thrills inherent in driving a racing vehicle without subjecting himself to the dangers of a collision which are normally present when driving an unattached racing vehicle.

When two or more cars are raced on the same road or racecourse at the same time, the tracks should be spaced sufficiently far apart so that the two cars cannot collide with each other under any circumstances. Therefore, the two track structures 84 and 86, of FIG. 7, have been spaced apart a distance c so that if the two racing vehicles or cars 80 and 82 were to simultaneously "spin out," while adjacent to each other, the cars would not collide. The connecting structures 88 and 90 will check the movement of the cars transversely to the tracks 84 and 86 before the cars can come into contact with each other.

While particular embodiments of the invention have been shown, it should be understood, of course, that the invention is not limited thereto, since many modifications may be made; and it is, therefore, contemplated to cover by the appended claims any such modifications as fall within the true spirit and scope of the appended claims.

I claim:

1. In a combination of a vehicle and a road supporting the same, said vehicle having front and rear road-contacting wheels, said front wheels being pivotally mounted for the steering of said vehicle upon said road, and steering means provided by said vehicle and connected to said front wheels for the manual steering of said vehicle by a driver thereof, the structure comprising channel-defining track means rigidly mounted in said road beneath the surface thereof and extending longitudinally therealong, said track means including generally horizontal flange means adjacent the upper surface of said road, a dolly having a portion thereof received by said track means and restrained against vertical displacement therefrom by said flange means, said dolly being freely movable longitudinally along said track means, and a linkage assembly connecting said dolly to said vehicle, said assembly including an elonagted link pivotally connected at one end by a universal joint to said dolly and being pivotally connected at its opposite end by a universal joint to said vehicle, whereby, said linkage assembly permits substantial lateral, rotational, and vertical movement of said vehicle under the control of a driver as said vehicle is moved along said track while at the same time providing limits of vertical and lateral movement of said vehicle to prevent injury to said driver and others.

2. The structure of claim 1 in which power means are provided for propelling said vehicle along said road.

3. The structure of claim 2 in which said power means includes a motor mounted in said vehicle and operable to drive at least one of the wheels thereof.

4. The structure of claim 1 in which said second-mentioned universal joint is disposed beneath said vehicle intermediate the front and rear wheels thereof.

5. The structure of claim 4 in which said link is shorter than one-half of the distance between the front and rear wheels of said vehicle.

6. The structure of claim 1 in which said road is provided with a second track substantially identical to said first track and parallel thereto, a second vehicle substantially identical to said first vehicle, and a second dolly and second linkage assembly substantially identical to the first-mentioned dolly and linkage assembly connecting said second vehicle to said second track, said first and second tracks being spaced laterally apart a distance greater than twice the maximum horizontal distance from the universal joint of each dolly to the outer limits of the vehicle connected thereto.

7. The combination of first and second vehicles having front and rear wheel means for supporting said vehicles on a road, a first and a second track means mounted in said road with an uppermost edge portion of said first and second track means adjacent an upper surface of said road, a first dolly slidably moutned on said first track means, said first dolly being held against vertical displacement relative to said road by said first track means, a second dolly slidably mounted on said second track means, said second dolly being held against vertical displacement relative to said road by said second track means, first and second linkage means, a first universal joint fastening said first linkage means to said first dolly, said first universal joint enabling said first linkage means to rotate both horizontally and vertically relative to said first dolly, a second universal joint mounted on said first vehicle intermediate said front and rear wheel means of said first vehicle, said second universal joint enabling said first vehicle to rotate relative to said first linkage means, a third universal joint fastening said second linkage means to said second dolly, said third universal joint enabling said second linkage means to rotate both horizontally and vertically relative to said second dolly, and a fourth universal joint mounted on said second vehicle intermediate said front and rear wheel means of said second vehicle, said fourth universal joint enabling said second vehicle to rotate relative to said second linkage means, said first track means being located at a predetermined distance from said second track means whereby said first and second vehicle are retained in spaced apart relationship at all times.

8. The combination as set forth in claim 7 wherein said first dolly and said first universal joint are located between the front and rear wheel means of said first vehicle, and said third universal joint and said second dolly are located between the front and rear wheel means of said second vehicle.

9. A linkage assembly for connecting a vehicle to a track, comprising a carriage means for engaging said track, a link member, a first universal coupling means connecting said link member to said carriage means for universal movement of said link member above a plane through an uppermost portion of said carriage means, a connector unit adapted to be connected to said vehicle, and a second universal coupling means connecting said connector unit to said link member for a universal motion of said connector unit relative to said link member.

10. An assembly as set forth in claim 9 wherein said carriage means includes a body member, first and second axle means connected to said body member, a first wheel means rotatably mounted on said first axle means, and a second wheel means rotatably mounted on said second axle means.

References Cited

UNITED STATES PATENTS

| 886,627 | 5/1908 | Neebe | 104—139 XR |
| 924,182 | 6/1909 | Neville | 104—247 |
| 2,925,875 | 2/1960 | Bourdon | 104—245 XR |

ARTHUR L. LA POINT, *Primary Examiner.*

H. BELTRAN, *Assistant Examiner.*